(12) United States Patent
Hendrickson et al.

(10) Patent No.: US 7,455,523 B2
(45) Date of Patent: Nov. 25, 2008

(54) MEDICAL SIMULATION SYSTEM AND METHOD

(75) Inventors: Daniel Lee Hendrickson, Golden, CO (US); Raymond Lopez, Denver, CO (US); William Younkes, Greenwood Village, CO (US)

(73) Assignee: Medical Simulation Corporation, Denver, CO (US)

( * ) Notice: Subject to any disclaimer, the term of this patent is extended or adjusted under 35 U.S.C. 154(b) by 333 days.

(21) Appl. No.: 11/107,025

(22) Filed: Apr. 15, 2005

(65) Prior Publication Data
US 2005/0277096 A1 Dec. 15, 2005

Related U.S. Application Data

(60) Provisional application No. 60/579,504, filed on Jun. 14, 2004.

(51) Int. Cl.
*G09B 23/28* (2006.01)
(52) U.S. Cl. ........................... 434/262; 434/272
(58) Field of Classification Search ................. 434/262, 434/265, 267, 270–275; 345/156–158, 161
See application file for complete search history.

(56) References Cited

U.S. PATENT DOCUMENTS

| | | | |
|---|---|---|---|
| 6,024,576 A | 2/2000 | Bevirt et al. | |
| 6,088,020 A * | 7/2000 | Mor | 345/156 |
| 6,113,395 A | 9/2000 | Hon | |
| 6,375,471 B1 * | 4/2002 | Wendlandt et al. | 434/262 |
| 6,470,302 B1 * | 10/2002 | Cunningham et al. | 703/7 |
| 6,538,634 B1 | 3/2003 | Chui et al. | |
| 6,654,000 B2 | 11/2003 | Rosenberg | |
| 6,929,481 B1 * | 8/2005 | Alexander et al. | 434/262 |
| 7,249,951 B2 * | 7/2007 | Bevirt et al. | 434/262 |
| 7,249,952 B2 * | 7/2007 | Ranta et al. | 434/263 |
| 7,404,716 B2 * | 7/2008 | Gregorio et al. | 434/272 |
| 2002/0168618 A1 | 11/2002 | Anderson et al. | |
| 2003/0068607 A1 | 4/2003 | Gregorio et al. | |

FOREIGN PATENT DOCUMENTS

| | | |
|---|---|---|
| WO | WO 2004/051601 | 6/2004 |
| WO | WO 2004/051601 A1 | 6/2004 |
| WO | WO 2004/051602 | 6/2004 |
| WO | WO 2004/051602 A1 | 6/2004 |
| WO | WO 2004/051603 | 6/2004 |
| WO | WO 2004/051603 A1 | 6/2004 |
| WO | WO 2004/051604 | 6/2004 |
| WO | WO 2004/051604 A1 | 6/2004 |

* cited by examiner

*Primary Examiner*—Kurt Fernstrom
(74) *Attorney, Agent, or Firm*—Swanson & Bratschun, LLC

(57) ABSTRACT

A portable medical simulation system and method employs an artificial patient with a built-in haptic interface device, with up to four carriages for engaging different diameter catheters. A catheter stabilizer between each carriage expands and contracts in an accordion fashion as the carriages move in relation to each other, preventing the catheter from bending and bowing. A contrast display visual effect derived from a particle emitter software tool simulates the release of radiopaque dye within a simulated vasculature system for display on a monitor. A computer software based system is used for generating haptic effects on the catheter through control signals passed to each of the carriage motors controlling translation movement of the catheter and magnetic particle brakes controlling rotational movement of the catheter.

14 Claims, 13 Drawing Sheets

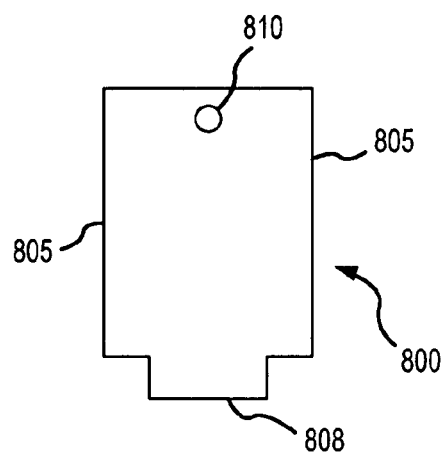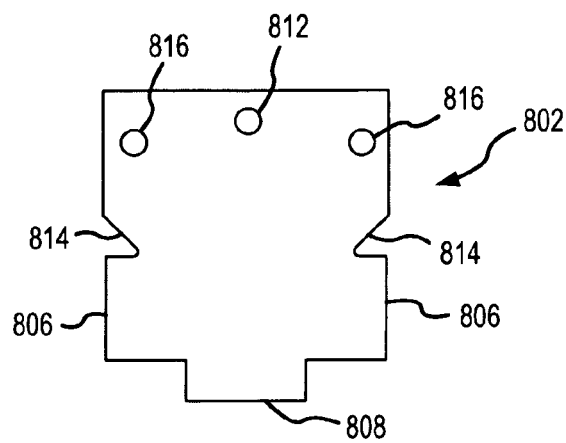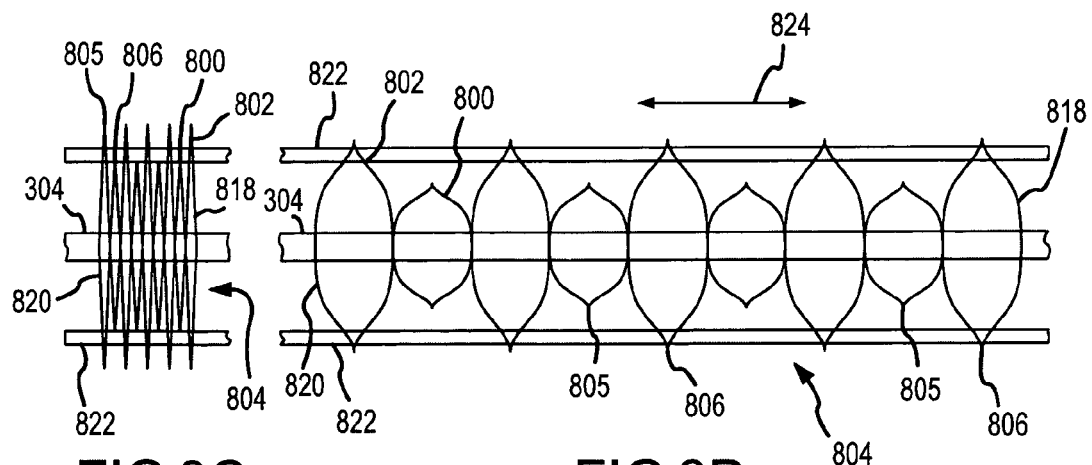
FIG.8A   FIG.8B   FIG.8C   FIG.8D

MEDICAL SIMULATION SYSTEM AND METHOD

CROSS REFERENCE TO RELATED APPLICATION

This application claims the benefit of U.S. Provisional Application No. 60/579,504, filed on Jun. 14, 2004, titled "Medical Simulation System And Method", and this application is related to a co-pending patent application titled "3D Visual Effect Creation System And Method" and filed on the same day herewith which is licensed by the same assignee of this invention.

FIELD OF THE INVENTION

This invention relates to the field of simulations for medical training, and more particularly, to an enhanced method and system for training healthcare teams.

BACKGROUND OF THE INVENTION

Healthcare education leaders have seen the need for simulation systems that efficiently train, evaluate, and enhance individual medical practitioner's skills to improve patient outcomes. In a recent survey, 73 of the 124 US medical schools are using some form of computer simulation for student evaluation. The development of simulation and training centers for the cognitive training of healthcare professionals in the practice of interventional medical procedures represents a significant advance in being able to promote the best demonstrated practices in the use of existing and new products and procedures. The introduction rate of new therapeutic devices and procedures is accelerating such that the lifecycle of a new product can be as short as eighteen months. At the same time the American College of Cardiology ("ACC") reports that 50% of the 10,000 interventional cardiologists do not meet the minimum standards for procedure competency. Current training methodology cannot address these problems. The answer is broad access to cognitive training and education on an industry wide universal platform that the present invention provides.

BRIEF DESCRIPTION OF THE DRAWINGS

FIGS. 8A, 8B, 8C, and 8D show various views of an embodiment of the catheter stabilizer within the haptic interface device in an embodiment of the portable medical simulation system for training healthcare teams of the present invention.

DETAILED DESCRIPTION OF THE INVENTION

Figure 1:
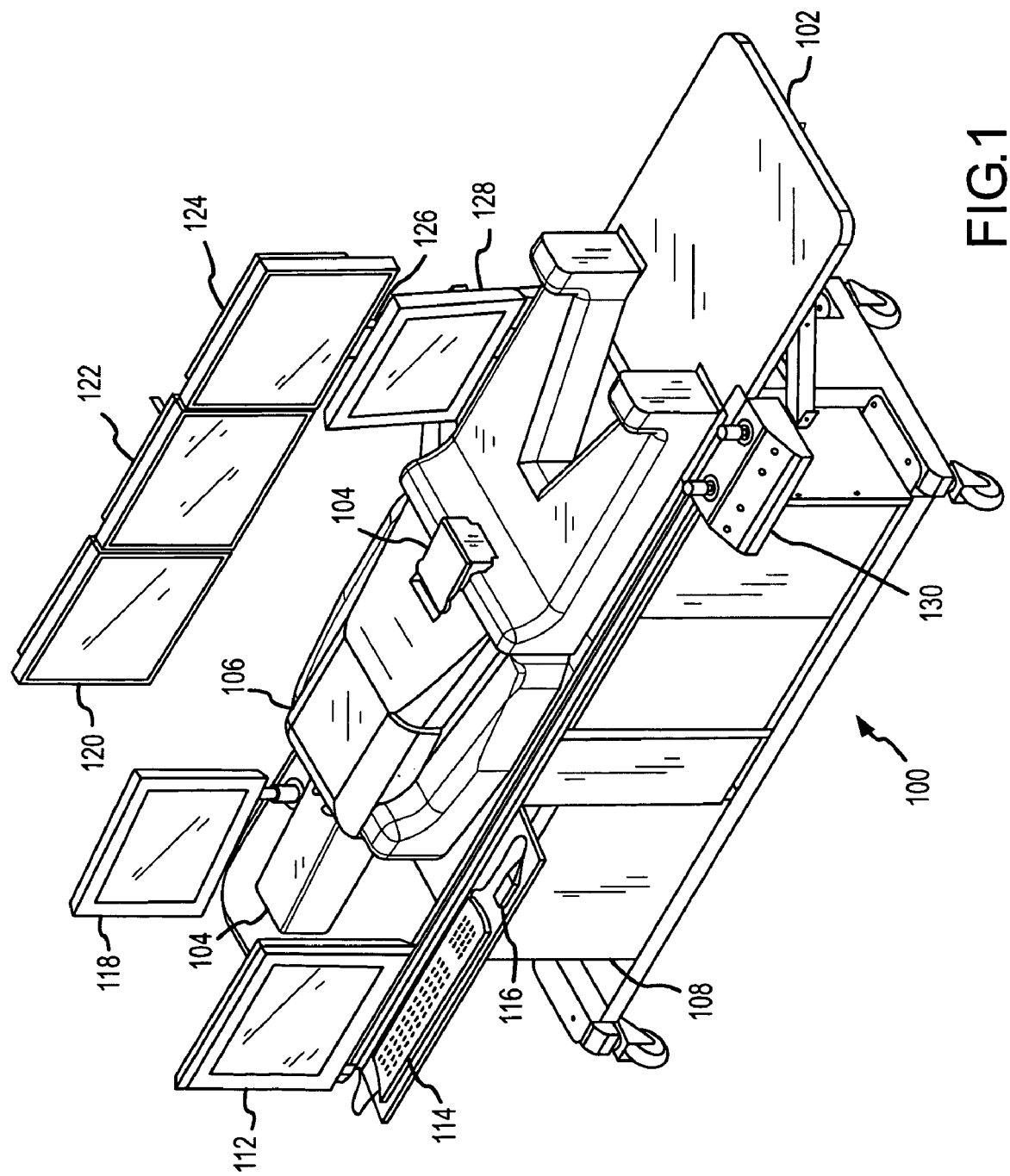
FIG. 1 shows a perspective view of an exemplary embodiment of the portable medical simulation system for training healthcare teams of the present invention.

Referring now to the Figures, in which like reference numerals and names refer to structurally and/or functionally similar elements thereof, FIG. 1 shows a perspective view of an exemplary embodiment of the portable medical simulation system for training healthcare teams of the present invention. Referring now to FIG. 1, Simulation System 100 provides an industry platform, a standard for technical parameters, skill assessment and measurement, and communications capability. A unique aspect of the invention is the use of Artificial Patient 106 for cognitive training and decision making. Prior art, such as U.S. Pat. No. 6,074,213, granted to David C. Hon on Jun. 13, 2000, describes a procedural training system that is an event driven state model that utilizes a rule-based expert system that is resident at each workstation. The medical simulation method and system for training healthcare teams of the present invention utilizes Artificial Patient 106 where the attributes of the simulated patient's anatomy, disease state, and the decisions and selections of the team member interact in both a deliberate and random manor, as in a real patient, to produce unpredictable outcomes. Even though a team member may properly execute a medical procedure, other complications as a result or related to the procedure, anatomy, disease state, medical device, or drug agent could result in an adverse event and a negative outcome. Conversely, if a team member initially experiences an adverse event but recognizes the implications of the event and implements appropriate corrective action, a negative outcome can be avoided. Through the use of Artificial Patient 106 the team member is trained and evaluated in the proficiency of their cognitive skills for treating the patient, not just their skills in performing medical procedures.

A network of Simulation Systems 100 located across the country can provide a cost-effective platform for medical device manufacturers, medical societies, hospitals, and educational institutions to distribute their cognitive training products to healthcare industry personnel. A standardized design and layout of each Simulation System 100 ensures that courseware that is developed at one Simulation System 100 location can be consistently utilized at other Simulation System 100 locations, providing the highest quality and most effective education. Universal standards will create a level playing field for all stakeholders. Medical personnel will have access to training on a daily basis if needed. Field sales people can host selected physicians at a local Simulation System 100 without incurring undue travel cost and time. Product adoption can occur in a matter of months nationally and internationally. Universal standards created for training and skill assessment can be measured and gauged. Each Simulation System 100 is designed to run courseware developed from a variety of different information sources including, but not limited to, medical device companies, medical societies, accreditation organizations, medical schools, medical centers who advance development of new procedures and therapies, and prominent industry authors. Simulation System 100 can be utilized to introduce new products, demonstrate difficult procedures, evaluate the effectiveness of new procedures, evaluate the effectiveness of team training, health care professional credentialing, and the effectiveness of hospital training programs.

Simulation System 100 may be used to establish uniform standards for the development of interactive training courseware and provide comprehensive and objective databases on the performance of medical operators, health care support personnel, and medical institutions. The database may provide feedback on the results of courseware for new health care products and procedures. The uniform standards and database may provide for both general information for all participants and proprietary information to individual participants, such as medical device manufacturers.

Simulation training utilizing Artificial Patient 106 is not simply an extension of traditional training methodology, but rather is a significant new tool for the medical industry. This tool has the built-in capability to consistently train healthcare professionals in the best-demonstrated practice and in the use of the product to achieve the highest probability of producing a successful outcome. In addition, the system evaluates individuals and teams of healthcare professionals in state-of-the-art medical procedures, knowledge, cognitive skills, and documents their performance of the simulated procedures. Cognitive skills can be gained from real life experience and from good simulation experience. Real life experiences are subject to many risks as opposed to simulation experiences, which have far fewer risks.

The aviation field, with its outstanding safety record, has learned that to provide true cognitive training you must address four key teaching elements: manual dexterity skills, perceptual skills, fund of knowledge, and decision making. Together, these four elements are combined into a dynamic learning process that exposes the participant to a variety of situations that builds depth of experience that cannot be gained in routine practice. Simulation improves decision making on the part of the participant, compared to traditional training methodology, because the consequences resulting from the interaction with the simulation interfaces are fed back to the participant immediately, just as in real life situations, forcing acceptance and/or resolution of problems in real-time. The commercial aviation field now relies on simulation training to the extent that commercially qualified pilots who are trained in simulators are certified to fly aircraft that are transporting revenue-paying passengers upon completion of training in certified simulation facilities.

The parallels between the challenges of training pilots and physicians have been recognized by the medical societies. The American College of Cardiology, the Society for Cardiovascular Angiography and Interventions, the Society for Vascular Medicine and Biology, and the Society for Vascular Surgery have all made firm commitments that simulation training must be incorporated into the physician training process.

The availability of new medical technologies is expanding at an ever-increasing rate. This expanding universe of new technologies has created a formidable task for individual physicians, nurses, and local hospitals to continuously-maintain their proficiency and provide the best possible healthcare consistently across the U.S. and around the world. Recently the Institute of Medicine reported it can take seventeen years for important medical discoveries to become accepted and used by the average doctor. On an annual basis, the United States Food and Drug Administration approves approximately 24 new medical devices for interventional cardiology alone. The daunting problem faced by medical device manufacturers is how to effectively introduce and train 10,000 physicians at 700 key hospitals in a new product every eighteen months. The cost and throughput rate for bringing physicians to formal training centers is so high that medical device manufacturers cannot formally train all of their customers. The industry costs resulting from sub-optimal patient outcomes is estimated to be in the billions of dollars. In the cardiovascular field alone, a one-percent reduction in the need for Cardiac Bypass Graft Surgery ("CABG") would result in a $250 million reduction in healthcare costs to the American public. As the case experience of the physician increases, the American College of Cardiology has reported a direct correlation between the success associated with increased frequency in procedures and decreased risk of death or risk from a CABG procedure. Simulation System 100 is designed to enhance the skills of individual physicians and their teams by increasing their frequency and exposure to "real patient" clinical experiences. Simulation System 100 interactive simulation software is designed to introduce specific learning objectives and levels of complexity, or procedural consequences, into simulation courseware. Essential learning objectives can be indexed to higher levels of complexity as the participant masters the new skill or product as demonstrated by resolving increasingly complex procedural consequences. This unique approach to training, afforded by simulation, controls the balance between overwhelming a physician or nurse with unrecoverable consequences against too little training designed to avoid poor outcomes.

As simulations are performed, metrics are gathered and stored. Metrics are pieces of raw data that indicate competency of the participant. Metrics can be time measurements, amount of substance used measurements, position and force measurements, or test scores from a didactic test. Metrics are quantified and objective, not subjective, measurements of the participant's competency. Key metric parameters include basic skills, fund of knowledge, and decision making or process of care. These metrics can assist in assessing the design of new products or procedures, effectiveness of training programs, and the procedure competency of health care professionals. As this data grows, feedback can be provided to individual participants. For example, a participant may have taken six minutes to perform a particular procedure, whereas the average participant took three minutes. A participant can be shown where he or she falls on the curve of all previous participants and immediately begin corrective measures. Databases of this metric data are extremely valuable. They are very valuable to the individual because the individual will know where he or she will have to work on improving as professionals. The databases are valuable because a hospital will know how well a particular individual's performance compares to others, and how well improvement is progressing where needed. The hospital will be able to assess how well their doctors are doing compared to another hospital, and will be able to compare simulation results to the outcomes on actual patients. Doctors can practice very difficult procedures via Simulation System 100 as well as the procedures that they may only do one or two times in a lifetime. This practice can be done ahead of time so that the doctor is prepared when a real situation requiring the medical procedure with a real patient arises.

Simulation System 100 may provide on-demand simulation courseware on new products and procedures, documentation for hospital-based accreditation, Continuing Medical Education ("CME") courses, and grand round simulations from leading physicians and nurses. Utilizing the metrics gathered over time, services such as health professional accreditation data and documentation management as well as training documentation for hospital accreditation, malpractice and liability insurance assessment can be provided. Simulation System 100 will enable the rapid distribution of manufacturers' new and existing products using proprietary simulation courseware and provide on-demand market information on utilization of their products by users.

Simulation System 100 software and training programs besides the real-time in-room simulations are designed for access and review on the World Wide Web. This allows healthcare professionals to access training programs tailored to their training needs around their work schedules. Simulation System 100 and its associated training programs and website access provides healthcare professionals with a more time-efficient and cost-effective means for maintaining their proficiency. The medical simulation method and system for training healthcare teams of the present invention is a very efficient, effective, and consistent way to provide broad-range, on-demand simulation training and educational products. Worldwide access requires a high level of security. Proprietary courseware as well as general information may be distributed selectively. For example, a medical device manufacturer may limit distribution of new product courseware to approved clinical evaluation facilities only. Similarly, medical societies can limit distribution of new courseware to active members/subscribers.

Simulation System 100 is portable and can be moved to an appropriately sized room and is preferably set up to resemble an actual medical environment, such as a hospital emergency room, a catheter lab, operating room, etc. Lighting, sounds, medical equipment, and ancillary devices are designed to create the realism of conducting actual interventional procedures. Simulation System 100 is capable of providing individual operator as well as interactive team training. Simulation Table And Stand 102 has an upper portion which supports Artificial Patient 106 and Haptic Interface Device 104, which is located within Artificial Patient 106, at a convenient height for the team participants. In one embodiment, Artificial Patient 106 having Haptic Interface Device 104 is the SIMANTHA® Interventional Tactile-Force-Feel Simulator, an interactive artificial patient device developed by Medical Simulation Corporation. Simulation Table And Stand 102 has a lower portion with caster wheels which enable Simulation System 100 to be very portable.

Simulation System 100 as shown in FIG. 1 has two Computers 108, (the second computer is hidden from view by the first computer and is located next to it on the lower portion of Simulation Table And Stand 102). Resident on one or both of Computers 108 are the various software modules that the medical simulations are built from, including a simulation engine module, a virtual team members module, a data manager module, a metric module, a pre-simulation brief web pages module, a testing module, a database module, and an event handler module. One skilled in the art will recognize that more or fewer computers could be utilized in the present invention depending upon the computing power of the computer(s), type of simulation system (hospital emergency room, a catheterization lab, operating room, etc.) and the particular medical procedure being simulated for training purposes (crash cart, interventional cardiology, interventional radiology, interventional neurology, arthroscopy, endoscopy, laparoscopy, anesthesia, and intensive and critical care nursing). Regardless of the number, the computer(s) and other hardware devices of Simulation System 100 are interconnected over an Ethernet or other suitable Local Area Network ("LAN") which may be, but is not limited to, wire, wireless, optical, etc.

Connected between Computers 108 and Haptic Interface Device 104 in one embodiment of the invention is Haptic Interface Computer 110 (more fully described below in relation to FIG. 11). Haptic Interface Computer 110 is located out of view behind the cabinet doors in the storage area of the lower portion of Simulation Table And Stand 102.

In one embodiment Simulation System 100 incorporates six different monitors to provide visual feedback to team participants and to allow user input through touch screen capability. From Selection Monitor 112 a user may select which simulation to run and initiate the commands to begin the simulation utilizing touch screen capability built into Selection Monitor 112, or the user may select the simulation to run utilizing Keyboard 114 and/or Mouse 116. Keyboard 114 and/or Mouse 116 rest on a slide-out tray that can be pushed back in and out of the way during the actual simulation.

Selection Monitor 112 is also used to make drug selections necessary for the simulation, which replicates the function of drug and/or fluid dispensing apparatus. The touch screen allows for fast and direct user input, and may resemble a real drug dispenser apparatus. The drug dispenser module provides a user interface to requisition drugs and is displayed on Selection Monitor 112.

Patient/Mentor Monitor 118 displays at various times during a simulation an animated person, a virtual person. The animated person may be the patient talking, or a mentor, a doctor, a nurse, or any other individual appropriate for a given medical simulation. The virtual person at the beginning of the simulation may appear on Patient/Mentor Monitor 118 and through audio output tell the team participant(s) about what he or they are about to do. Patient/Mentor Monitor 118 may also be touch screen enabled. Pre-recorded messages for delivery by the animated person, which may be audio only, audio and video, or video only, are stored in the database for each different medical simulation. Then, at the appropriate time, the pre-recorded audio, audio/video, or video message is called and output to the participant through Patient/Monitor 118.

In another embodiment of the invention, various text files associated with the simulation selected may be retrieved from the database. The text in the files is then synthesized into audio speech, and the virtual person's image is synchronized with the audio speech such that the virtual person's lips move, eyes blink, and other facial movements are coordinated such that the virtual person appears to be talking naturally, just as a real person would talk. Thus, three separate technologies, 3D graphics modeling and rendering, taking text and converting it into actual audio, and then combining the 3D graphics modeling with the audio, provide a very realistic virtual person. This is all done on-the-fly in response to events driven by the participants during the simulation. Simulation System 100 has complex rules engine that are followed based upon the actions of the participant or team of participants. The animated persons appear on Patient/Mentor Monitor 118 at various times linked to on-the-fly events. A physician participating in the simulation may make one decision, and the nurse participating in the simulation may make another decision based upon the physician's decision. The animated person needs to say the right thing based upon these two independent decisions, and this has to be done on-the-fly. Since the medical team participants will be doing things on-the-fly, the system has to be able to respond on-the-fly as well, and will retrieve the appropriate text file for conversion to speech. In addition, some of the events are actually random, as opposed to just in response to what one of the participants did. If a participant makes a bad decision then worse events may take place. Even if a participant makes good decisions the random event could result in a bad event happening. The system does have random serious events that happen similar to occurrences in real life. Thus, the system reaches a level of realism as encountered in real life.

Road Map Monitor 120 displays stored fluoroscopic images of the patient and serves as the guide to the participant(s) for the simulation procedure selected. Simulation System 100 utilizes a technique called Tri-Reality Simulation. Tri-Reality Simulation is a hybrid combination of actual (real) components, virtual components, and simulated components. A simulated component exists in reality, such as a catheter manipulated by the physician on Artificial Patient 106 in conjunction with Haptic Interface Device 104. Real components may be fluoroscopic, sonographic, MRI, PET, or like images taken from real patients and used in the simulation through display on Road Map Monitor 120. Rendered images displayed are the virtual components, such as a rendered image of a contrast injection displayed on Fluoroscopic Monitor 122.

A still picture selected by the physician from one of the many diagnostic images presented to the physician at the beginning of a simulation is displayed on Road Map Monitor 120 throughout the medical procedure simulation. The selection of the diagnostic image by the physician is one of the factors the physician is graded on during the simulation. The better or more optimal the diagnostic view the physician selects, the better grade the physician will receive for selecting the better road map diagnostic image. The graphics module also provides a simulation of fluoroscopic images, sonogram images, MRI, PET, or other images of the like in synchronization with the currently running simulation.

In typical prior art simulation systems that employ virtual reality, backgrounds for graphic display are being fully volume rendered via software. This full volume rendering increases the computational time and required hardware resources by a factor of ten to fifteen times over the Tri-Reality Simulation method of the present invention. Volume rendering everything being displayed with software necessitates utilizing expensive and high-powered processing hardware to do the necessary mathematical computations. The present invention uses real fluoroscopic, sonogram, MRI, or PET video images in the background (retrieved from the database), and renders only the medical device, such as a catheter, being used by the physician in the simulation in the foreground, and the vascular tree if the simulation has called for radiopaque dye. By doing this, the speed of the system is increased well beyond the capabilities of prior art systems.

Fluoroscopic Monitor 122 shows simulated live fluoroscopic images of Artificial Patient 106 in response to the participant who is manipulating the medical device that interacts with Haptic Interface Device 104. Hemodynamic Monitor 124 displays vital statistics of Artificial Patient 106 such as blood pressure, $O_2$ levels, pulse rate, EKG, and other related vital signs or diagnostic outputs.

In one embodiment of the invention, Road Map Monitor 120, Fluoroscopic Monitor 122, and Hemodynamic Monitor 124 are attached to a Support Bar 126. All three monitors can be raised and lowered by Support Bar 126, and can pivot about Support Bar 126 in order to provide the participants with a better view of the three monitors. In addition, all three monitors can individually be swiveled left and right, and tilted forward and back to aid in positioning each monitor to suit the preference of the participant(s).

Equipment Selection Monitor 128 allows the participant to select the particular medical device, such as a catheter, that the participant believes is called for in light of the particular simulation selected and the corresponding patient problem. Equipment Selection Monitor 128 typically has touch screen capability as well. Dual Joy Stick Controller 130 simulates for the participant control of a C-Arm device and patient table panning.

Figure 2:
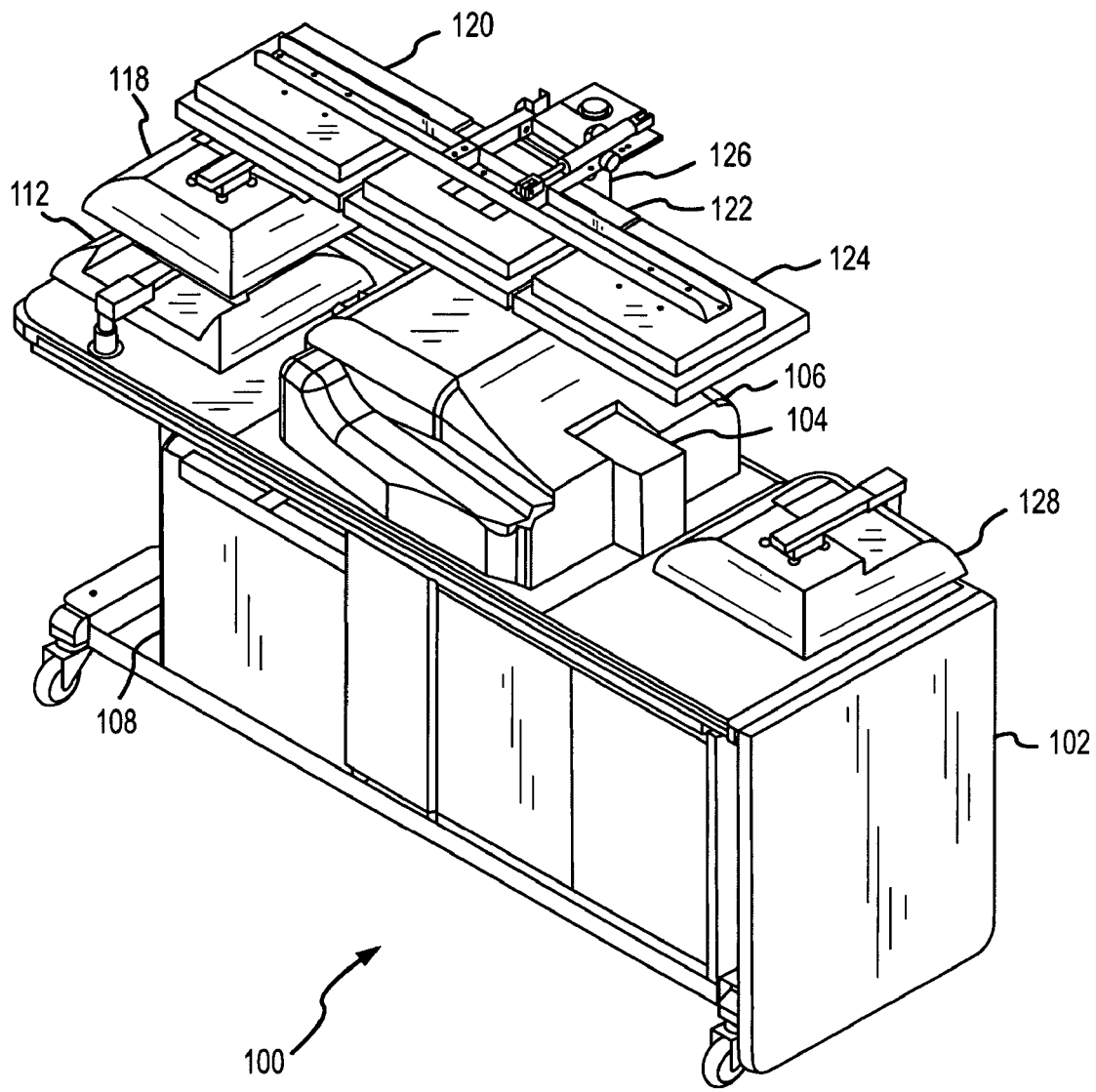
FIG. 2 shows a perspective view of an exemplary embodiment of the portable medical simulation system of FIG. 1 in a collapsed state ready for transport of the present invention.

FIG. 2 shows a perspective view of an exemplary embodiment of the portable medical simulation system of FIG. 1 in a collapsed state ready for transport of the present invention. Referring now to FIG. 2, parts of Artificial Patient 106 are stored in the storage area below the upper portion of Simulation Table And Stand 102. All of the monitors have been collapsed down and inward on their support columns. The table extension portion of Simulation Table And Stand 102 has been folded down and Dual Joy Stick Controller 130 has been stowed in the storage area. A rigid or flexible top (not shown) can be placed on top of Simulation Table And Stand 102 and secured thereto for short term storage, or for transportation to a different location, which may be across town or across the country.

Figure 3:
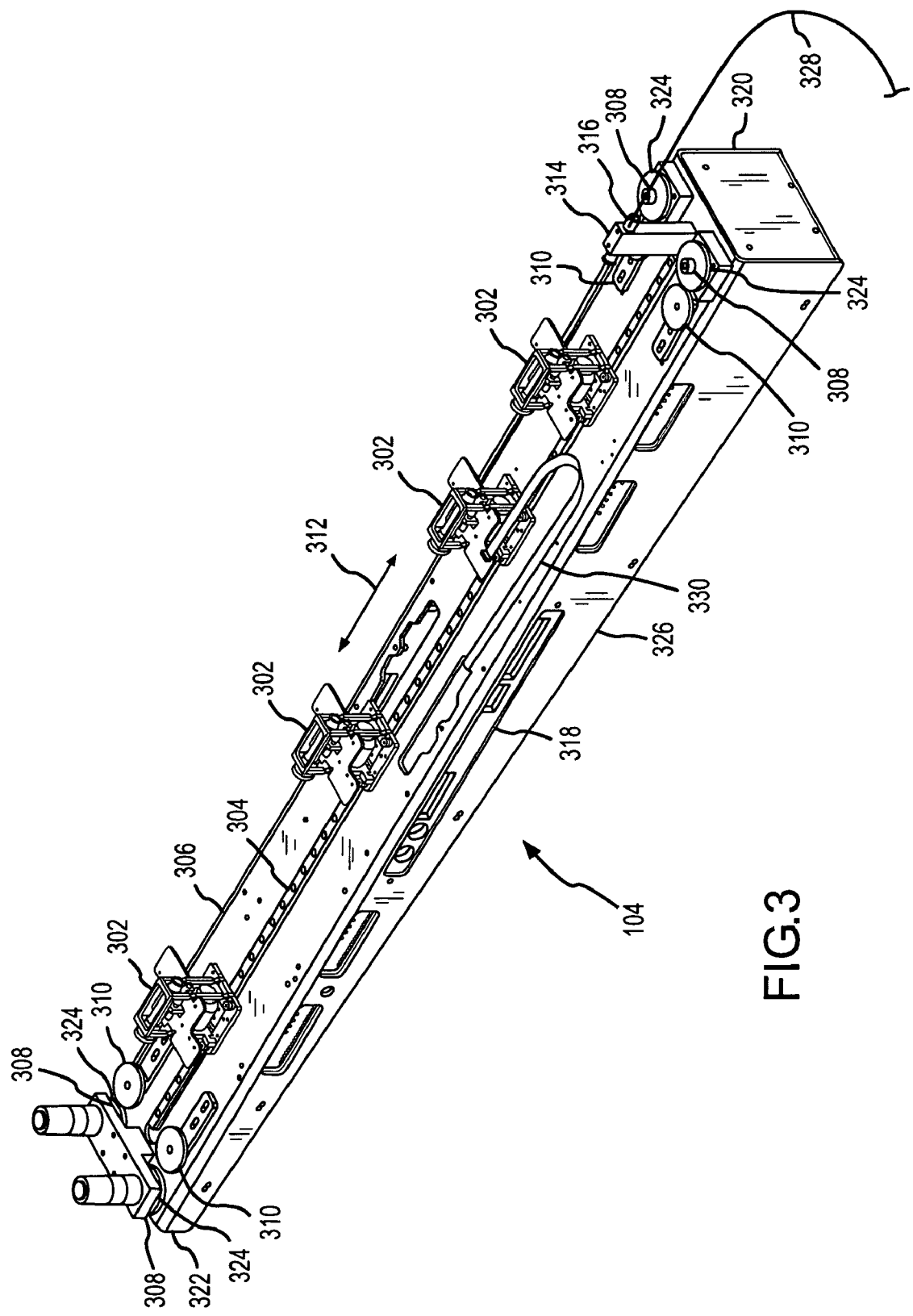
FIG. 3 shows a perspective view of the haptic interface device in an embodiment of the portable medical simulation system for training healthcare teams of the present invention.

FIG. 3 shows a perspective view of the haptic interface device in an embodiment of the portable medical simulation system for training healthcare teams of the present invention. Referring now to FIG. 3, the top panel and side panels have been removed to show more clearly the inside portions of Haptic Interface Device 104. Haptic Interface Device 104 has a wedge-shaped Frame 326, with a Thick End 320 located in the lower body and a Thin End 322 located in the head region of Artificial Patient 106. This arrangement allows gravity to assist movement of the Carriages 302 when engaged with a Catheter 328. Haptic Interface Device 104 is designed to accommodate up to four Carriages 302 which allows up to four different sized catheters to be utilized in a given simulation. Haptic Interface Device 104 may be built with only one, two, or three Carriages 302 instead of the four as shown for a given intended application.

There are two Drive Motors 308 located at each end of Carriage Bed 306, along with two Idler Pulleys 310. Each Drive Motor 308 and each Idler Pulley 310 are located on the outer edges of Carriage Bed 306, with the Rail 304 extending in between. Each Carriage 302 is paired with a Drive Motor 308 located on one end, and an Idler Pulley 310 located on the opposite end and on the same side of Rail 304. A first Drive Belt 444 is attached at a Fore End 440 to a first Drive Belt Pinion 404 on Base 402 of a first Carriage 302 (see FIGS. 4 and 5). The first Drive Belt 444 is looped around a first Idler Pulley 310 at Thin End 322, then looped around a Fly Wheel 324 of a first Drive Motor 308 located at Thick End 320 and on the same side, and the second end of the first Drive Belt 444 is attached to a second Drive Belt Pinion 404 of the first Carriage 302. Drive Belt 444 is attached with enough tension such that when the Drive Motor 308 turns its Fly Wheel 324 in either rotational direction, first Carriage 302 will be translated back and forth along Rail 304 in the directions indicated by Arrow 312. Thus there are two paired Idler Pulleys 310 and Fly Wheels 324 of Drive Motors 308 on each side of Rail 304, and each pair are aligned at a different height from Carriage Bed 306 to allow freedom of movement of each Drive Belt 444.

Carriages 302 slide along Rail 304 which is affixed to Carriage Bed 306. From one up to four Carriages 302 may be installed, depending upon the scope of use of a particular Simulation System 100. Drive Motor 308 turns its corresponding Fly Wheel 324 rotationally causing Carriage 302 to translate back and forth along Rail 304. Once a given simulation has been selected, each Carriage 302 is moved to its starting position. Typically, all Carriages 302 (one, two, three, or four) are moved to Thick End 320 and stacked up against each other, with the first Carriage 302 butted up against Catheter Support Stand 314. In this position, the Carriages 302 are ready to receive Catheter 328 which is inserted into Catheter Support Tube 316.

The Carriage 302 that is closest to Catheter Support Stand 314 (the first carriage) is designed to engage the largest diameter catheter that is used in conjunction with Haptic Interface Device 104. The next Carriage 302 in line (the second carriage) is designed to engage the next to largest diameter catheter that is used. Similarly, the next Carriage 302 in line (the third carriage) is designed to engage a catheter whose diameter is smaller than the second carriage, and the last Carriage 302 (the fourth carriage) is designed to engage the smallest diameter catheter that is used in conjunction with Haptic Interface Device 104. As shown in FIG. 3, Catheter 328 has passed through the first Carriage 302 and has engaged the second Carriage 302.

Figure 7:
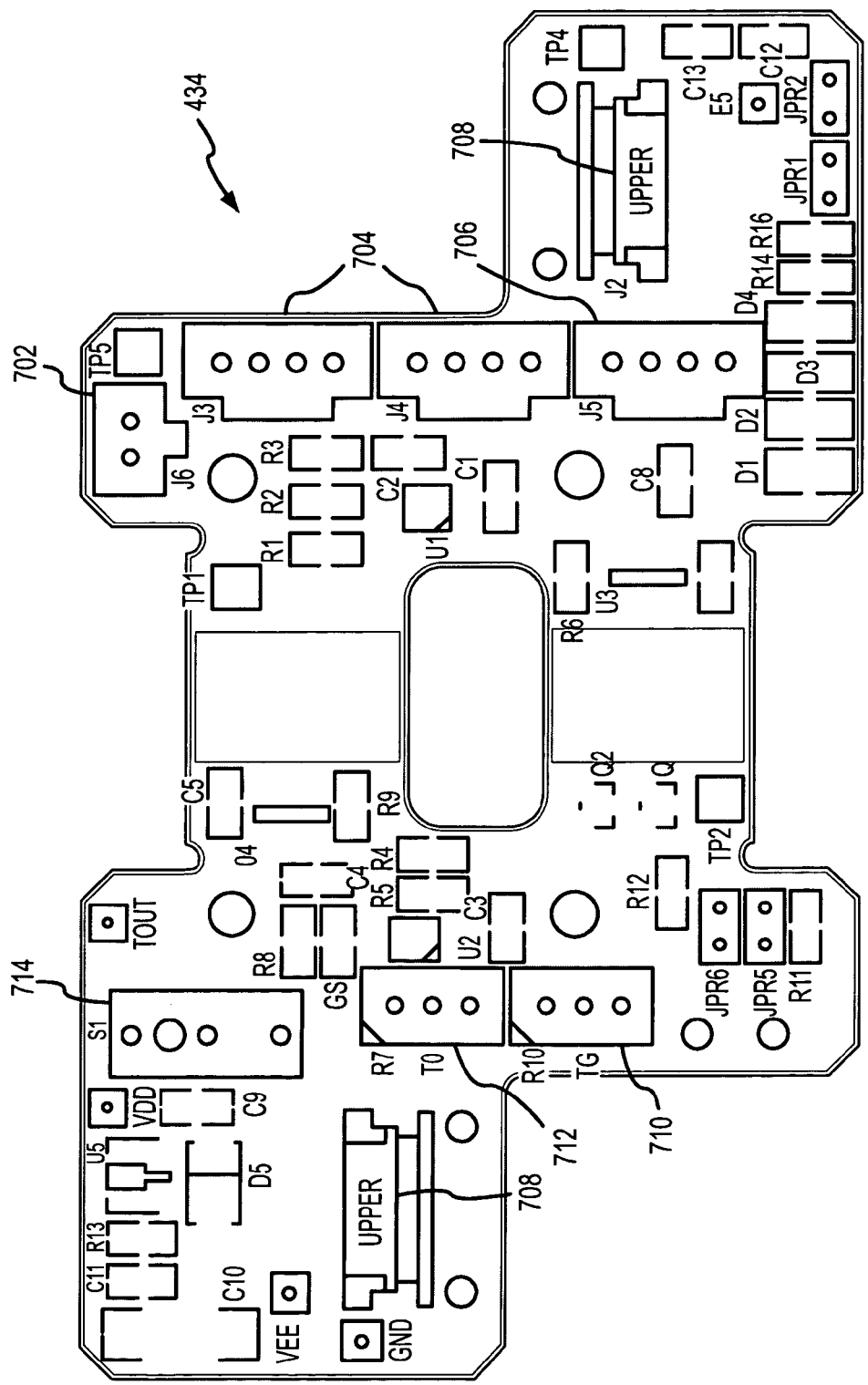
FIG. 7 shows a top plan view of the carriage printed circuit board of FIGS. 4, 5, and 6 in an embodiment of the portable medical simulation system for training healthcare teams of the present invention.

Each Carriage 302 has a Flex Circuit 330 (only one is shown in FIG. 3 for simplicity) attached to Carriage Printed Circuit Board 434 at either Junction 708 (see FIG. 7). Flex Circuit 330 extends and folds over on itself along Carriage Bed 306 as Carriage 302 is moved back and forth along Rail 304. The second end of Flex Circuit 330 is fixed to Carriage Bed 306 and from there connected to the Haptic Printed Circuit Board 318 located under Carriage Bed 306, which is electrically connected to Haptic Interface Computer 110. Positioned between each Carriage 302 and between the first Carriage 302 and Catheter Support Stand 314, but not shown in FIG. 3, is a Catheter Stabilizer 804 (see FIG. 8).

Figure 4:
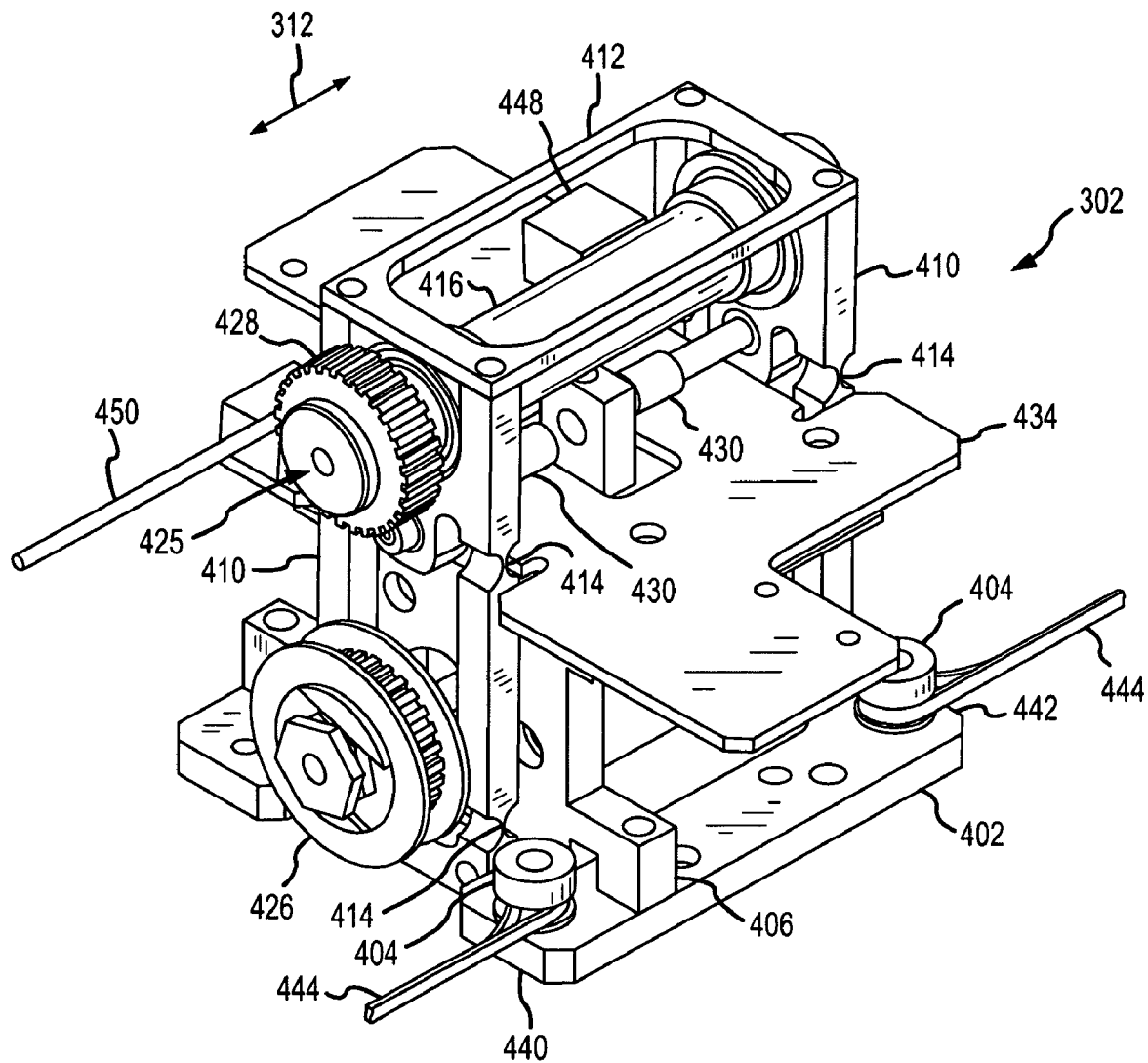
FIG. 4 shows a front perspective view of a carriage within the haptic interface device in an embodiment of the portable medical simulation system for training healthcare teams of the present invention.
Figure 5:
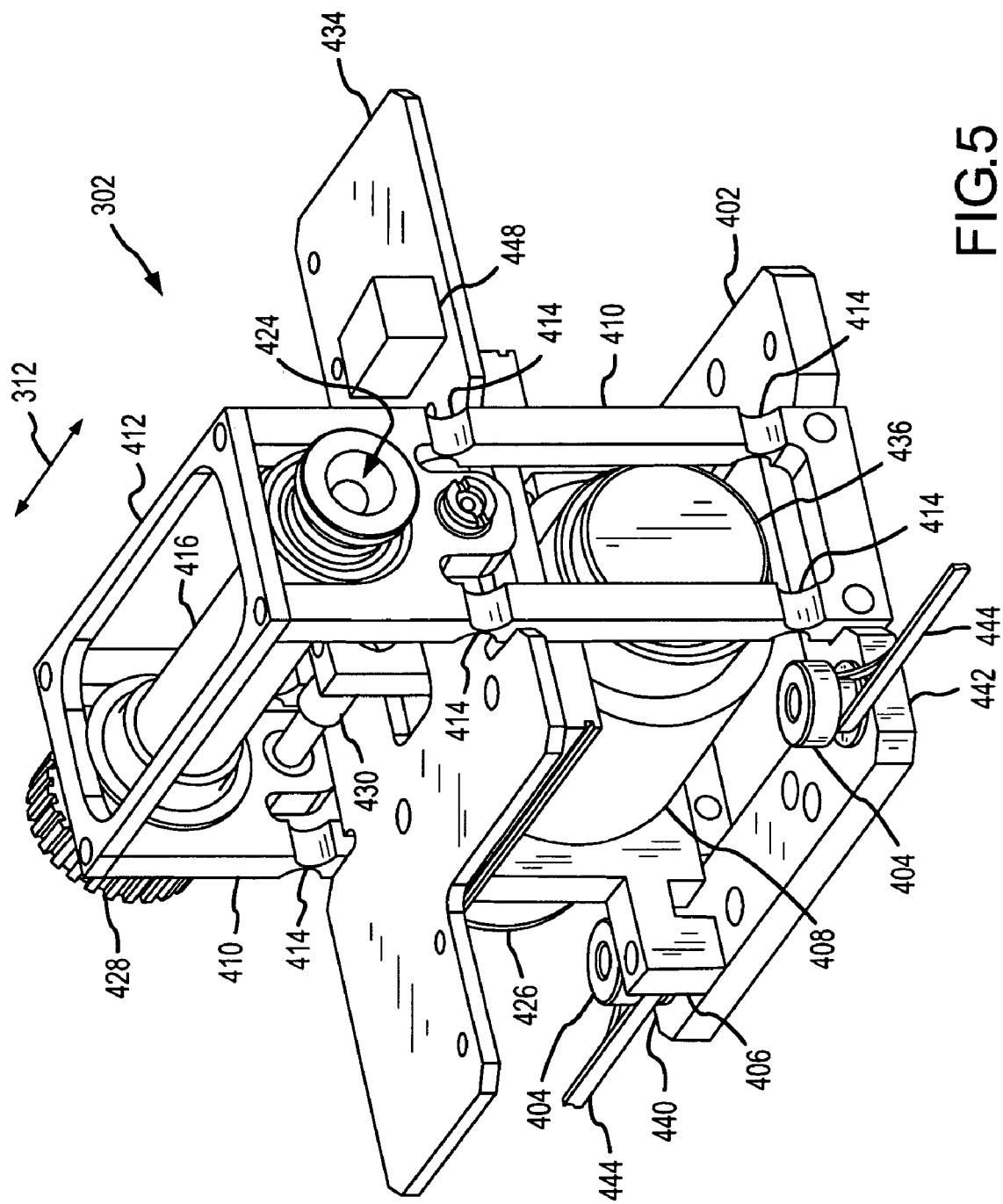
FIG. 5 shows a rear perspective view of the carriage of FIG. 4 in an embodiment of the portable medical simulation system for training healthcare teams of the present invention.
Figure 6:
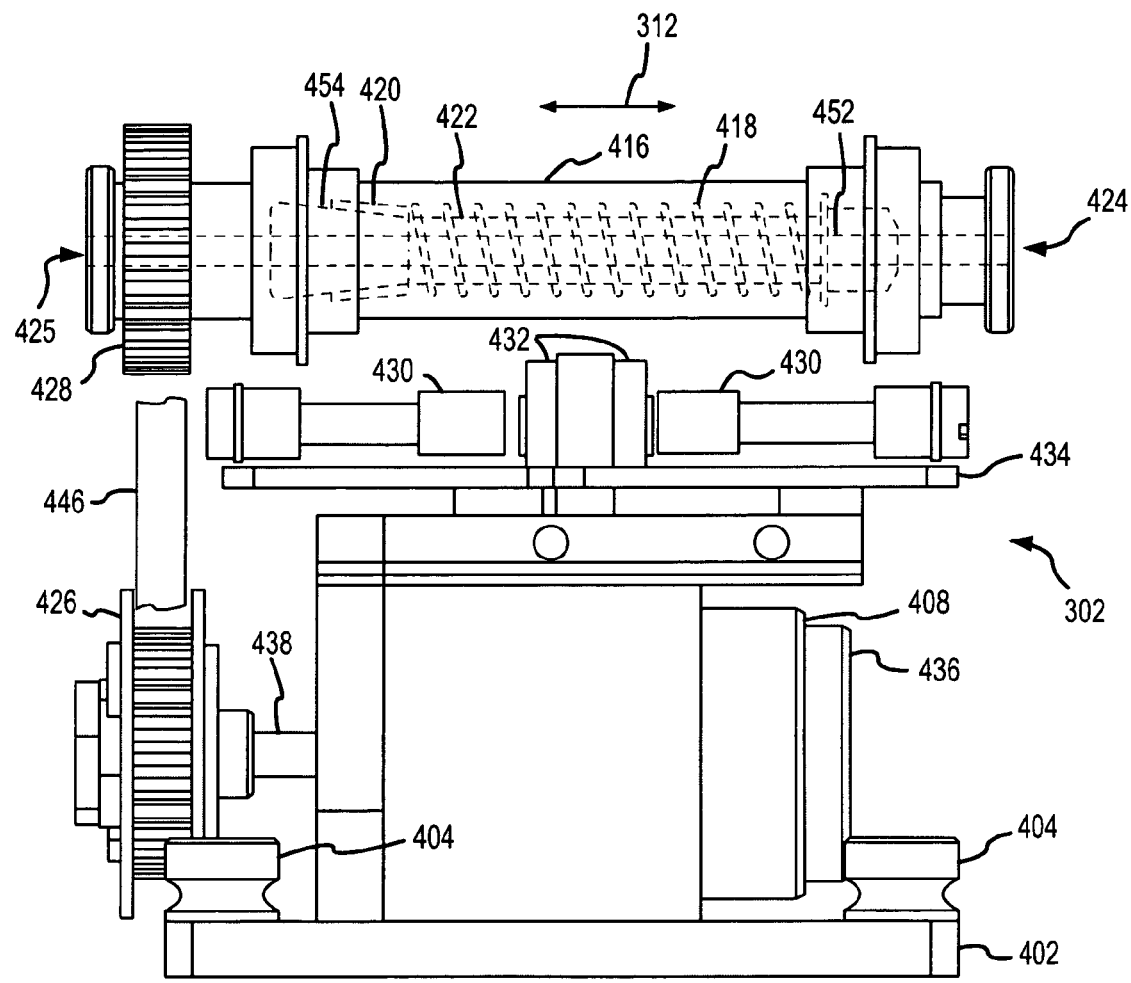
FIG. 6 shows a side view/hidden view of the carriage of FIG. 4 in an embodiment of the portable medical simulation system for training healthcare teams of the present invention.

FIG. 4 shows a front perspective view, FIG. 5 shows a rear perspective view, and FIG. 6 shows a side view/hidden view of a carriage within the haptic interface device in an embodiment of the portable medical simulation system for training healthcare teams of the present invention. Referring now to FIGS. 4, 5, and 6, Carriage 302 has Base 402 which bolts onto a Block (not visible) that slidably engages with Rail 304. Drive Belt 444 attaches to Drive Belt Pinions 404. Brake Bracket 406 attaches to Base 402 towards Fore End 440 and secures Magnetic Particle Brake 408 thereto. Optical Encoder 436 is attached to Shaft 438 of Magnetic Particle Brake 408. Two Flex Beams 410 also attach perpendicularly to Base 402, one at Fore End 440 and one at Aft End 442, and are connected transversely at the top by Cross Member 412. Each Flex Beam 410 has two legs with a lower and upper Thinned Sections 414. Flex Beams 410 are typically made of titanium, and Thinned Sections 414 allow slight bending when Spring Loaded Collet 416 of Carriage 302 comes into contact with Catheter Support Stand 314 or other Carriages 302. In another embodiment, Flex Beams 410 may only have one leg each, with a lower and upper Thinned Sections 414.

Spring Loaded Collet 416 is secured between the tops of Flex Beams 410 and below Cross Member 412. As shown in FIG. 6, Spring 418 is fully extended, forcing Circumferential Clamp 420 to engage with the larger Outward Tapered End 454 of Collet 422, all located within the outer housing of Spring Loaded Collet 416. This is the closed position for Spring Loaded Collet 416 at the beginning of a simulation. The inside diameter of Lumen 452 of Collet 422 is sized to cooperate with one of the up to four catheter sizes compatible with a specific Simulation System 100. Opening 424 receives the tip of a catheter, and if the catheter diameter is smaller than the diameter of Lumen 452 of Collet 422, the catheter will pass right through Lumen 452 of Collet 422 and out Opening 425 and proceed to the next Carriage 302.

If the catheter is the size that is designed to cooperate with this Collet 422 in Carriage 302, then upon entering part way through Lumen 452, the tip of the catheter will engage the restricted walls of Lumen 452. This exerts a force on Spring Loaded Collet 416 which is transferred throughout the structure of Carriage 302. The sensors, electronics, and software controls built into Simulation System 100 recognizes this force as an engage catheter state, and the Simulation System 100 responds by sending signals to Drive Motor 308 controlling Carriage 302 to force Carriage 302 to move against Catheter Support Stand 314, or an adjacent stationary Carriage 302 as the case may be, in order to compress Spring 418, allowing Collet 422 to open up, allowing the catheter to move farther through Lumen 452 of Collet 422. Then, the motion is reversed, causing Spring 418 to decompress, forcing Circumferential Clamp 420 to move along Outward Tapered End 454 of Collet 422, reducing the inside diameter of Lumen 452, which exerts a clamping force on the tip of Catheter 328, thus securing Catheter 328 to Carriage 302.

In a typical simulation, a small diameter Catheter 328, called a guide wire, may be inserted into Artificial Patient 106 through Catheter Support Tube 316. Depending upon the simulation, this small diameter Catheter 328 may pass right through the first, second, and third Carriages 302 before engaging the fourth Carriage 302. The guide wire is simulated and displayed on Fluoroscopic Monitor 122 as the participant continues to push and/or rotate the guide wire. Next, a larger diameter Catheter 328 may be inserted into Artificial Patient 106 over the guide wire such that the guide wire is within a lumen of the larger diameter Catheter 328. This larger diameter Catheter 328 will engage the Carriage 302 that is designed to cooperate with the size Collet 422 in its Carriage 302. As the participant pushes and/or rotates Catheter 328, it is simulated and displayed on Fluoroscopic Monitor 122. The user may now want to withdraw the smaller diameter guide wire, and does so by first pulling on the smaller diameter guide wire, which exerts a force on the Spring Loaded Collet 416 it is engaged with, which is transferred throughout the structure of that Carriage 302. The sensors, electronics, and software controls built into Simulation System 100 recognizes this force as a catheter exchange state, and the Simulation System 100 responds by sending signals to Drive Motor 308 controlling that Carriage 302 to force Carriage 302 to move against Catheter Support Stand 314, or the Carriage 302 next to it as the case may be, in order to compress Spring 418, allowing Collet 422 to open up, allowing the smaller diameter catheter to be released from Collet 422. The user can now easily remove the smaller diameter catheter from Artificial Patient 106. This removal is also simulated and displayed on Fluoroscopic Monitor 122. Thus, by analyzing the forces exerted by the user on the Catheters 328 engaging with each Collet 422 in a Carriage 302, the various stages of the simulation are tracked by Simulation System 100.

Magnetic Particle Brake 408 is used to provide feedback to the user for rotational movement of the Catheter 328 engaged with Collet 422. Magnetic Particle Brake 408 has Gear 426 and Spring Loaded Collet 416 has Pulley 428. Timing Belt 446 (shown in cut-away view in FIG. 6) wraps around both. Current is applied to Magnetic Particle Brake 408 to increase resistance to rotation.

Anvils 430 are attached to a top portion of each Flex Beam 410. Force Sensors 432 are attached to either side of an upper portion of Brake Bracket 406. When Spring Loaded Collet 416 moves into Catheter Support Stand 314 or another Carriage 302, Flex Beams 410 will bend at Thinned Sections 414. When viewed from a direction perpendicular to the direction indicated by Arrow 312, the upper portions of each Flex Beam 410 connected by Cross Member 412 and above the upper Thinned Sections 414, and the lower portion of each Flex Beam 410 connected to Base 402 and below the lower Thinned Sections 414, remain vertical. The middle portion of each Flex Beam 410 located between the Thinned Sections 414, will skew to the left or the right from vertical depending upon which side of Spring Loaded Collet 416 is being engaged with an adjacent structure, due to the flexible nature of each upper and lower Thinned Sections 414. Thus, one or the other Anvil 430 will be driven into one or the other Force Sensor 432. Force Sensors 432 are electrically connected to Carriage Printed Circuit Board 434 which is attached to Brake Bracket 406. Flex Circuit 330, Magnetic Particle Brake 408, and Optical Encoder 436 are also electrically connected to Carriage Printed Circuit Board 434.

In order to protect the Carriages 302 from damage due to severe collisions with each other, a Collision Sensor 448 is mounted on Carriage Printed Circuit Board 434. Collision Arm 450 extends from each Carriage 302 and is aligned in the direction indicated by Arrow 312. A Collision Arm 450 also extends from Catheter Support Stand 314 to detect impending collisions with the first Carriage 302. A Collision Sensor 448 is also mounted on Thin End 322 of Frame 326 (not shown) to detect collisions with a collision arm of the fourth (or last) carriage. The tip of Collision Arm 450 will engage Collision Sensor 448 if the Carriages 302 get too close to each other. Collision Sensor 448 sends a signal that translates to control signals to stop one or the other of the Drive Motors 308 to prevent the Carriages 302 from damaging each other.

FIG. 7 shows a top plan view of the carriage printed circuit board of FIGS. 4, 5, and 6 in an embodiment of the portable medical simulation system for training healthcare teams of the present invention. Referring now to FIG. 7, Junction 702 provides power to Magnetic Particle Brake 408. Junctions 704 are for the two Force Sensors 432. Junction 706 is for Optical Encoder 436. One or the other of Junction 708 is for Flex Circuit 330, depending upon the location of the particular Carriage 302 in relation to the other Carriages 302. Junction 710 is for the translation gain, and Junction 712 is for the translation offset. Junction 714 is for Collision Sensor 448.

FIGS. 8A, 8B, 8C, and 8D show various views of an embodiment of the catheter stabilizer within the haptic interface device in an embodiment of the portable medical simulation system for training healthcare teams of the present invention. Referring now to FIGS. 8A, 8B, 8C, and 8D, for very flexible catheters used in the medical simulation, a support means must be supplied to keep the catheter from bending and bowing in traversing distances between Carriages 302. Telescoping tubes have been used in the past as a means of stabilizing the catheter within a haptic device. The present invention utilizes Catheter Stabilizer 804 in one embodiment of the invention to stabilize flexible catheters between Carriages 302.

In FIG. 8C, Catheter Stabilizer 804 is shown in a top view in a contracted state typical of when two Carriages 302 are very close together. In FIG. 8D, Catheter Stabilizer 804 is shown in a top view in an expanded state typical of when two Carriages 302 are very far apart. The first Catheter Stabilizer 804 is attached on a First End 818 to Catheter Support Stand 314 and attached at its Second End 820 to Aft End 442 of a first Carriage 302. The second Catheter Stabilizer 804 is attached on First End 818 to Fore End 440 of the first Carriage 302 and attached at its Second End 820 to an Aft End 442 of a second Carriage 302. Thus, as each Carriage 302 moves in relationship to each other, Catheter Stabilizers 804 will expand and contract between them as shown.

Catheter Stabilizer 804 is made from two different sized links that are alternately adhered together at their middle portions to form an expandable linked structure. Primary Link 802 is shown in a front view in FIG. 8B, and Secondary Link 800 is shown in a front view in FIG. 8A. Primary Link 802 and Secondary Link 800 are made from a flat piece of material that is folded twice along Fold Edges 805, 806 and seamed, typically through an overlap between the two ends. The seam may be accomplished by an adhesive, or through heat welding. In another embodiment, the two ends could be butted up against each other and an adhesive strip applied over the abutted ends. In one embodiment of the invention, Primary Link 802 and Secondary Link 800 are made from a 0.003 inch thick Kapton film.

Bottom Edge 808 slides against the top surface of Rail 304. Notches 814 engage with Support Rails 822 located on either side of Rail 304 (see FIGS. 8C and 8D). Thus, Catheter Stabilizer 804 is prevented from moving up and down by Notches 814, Support Rails 822, and Rail 304 as it translates back and forth in the direction indicated by Arrow 824.

Catheter Holes 810 and 812 line up with Catheter Support Tube 316 and Openings 424, 425 in Spring Loaded Collets 416. Thus, a catheter inserted in Catheter Support Tube 316 will pass through each alternating Catheter Holes 810 and 812 of Catheter Stabilizer 804 before reaching Opening 424 and Lumen 452 in a Spring Loaded Collet 416 of a Carriage 302. After exiting the Carriage 302 through Opening 425, the catheter will pass through each alternating Catheter Holes 810 and 812 of a next Catheter Stabilizer 804 before reaching Opening 424 and Lumen 452 in a Spring Loaded Collet 416 of a next Carriage 302. Catheter Holes 810 and 812 are sized large enough to not impinge on a catheter inserted there through when Catheter Stabilizer 804 is in an expanded state. An oval shaped or oblong shaped hole may be used instead of a circular hole to help achieve this end. On either side of Catheter Hole 812 are Collision Arm Holes 816 which allow the Collision Arm 450 on a Carriage 302 to pass through in order to engage Collision Sensor 448 on the next Carriage 302. Since Secondary Links 800 are narrower in width, Collision Arm Holes 816 are not needed for Secondary Links 800.

A predetermined number of alternating Primary Links 802 and Secondary Links 800 are adhered together so as to be able to span, in an expanded state, the maximum distance anticipated between any pair of Carriages 302 or between a Carriage 302 and Catheter Support Stand 314 and stabilize the catheter across the separation distance. The reason Secondary Links 800 are narrower than Primary Links 802 is to allow an offset area for the Fold Edges 805 to lie when in the contracted state. If Secondary Links 800 and Primary Links 802 are the same width, then in the compressed state the Fold Edges 805, 806 all line up and tend to fan out due to their thickness and not allow for a tightly compressed structure.

Figure 9A:
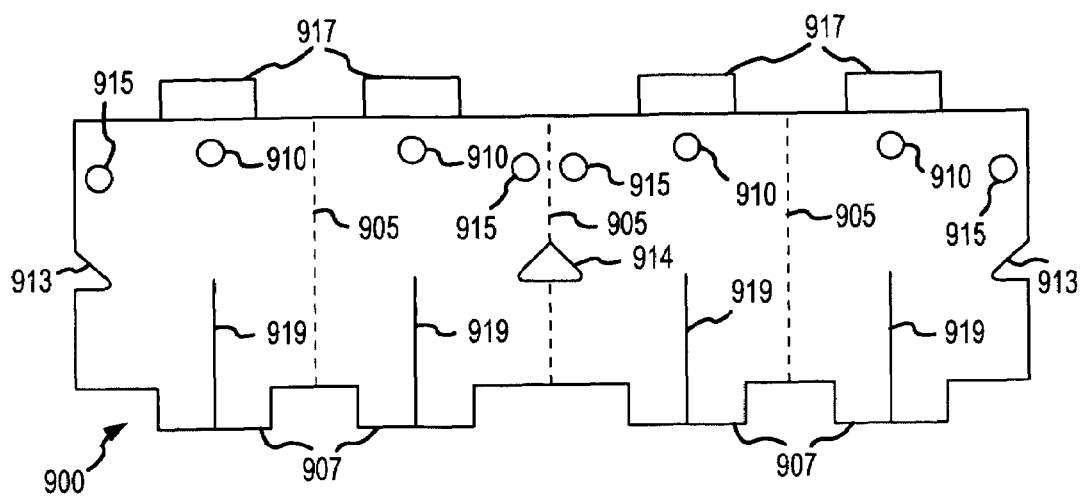
FIGS. 9A, 9B, 9C, and 9D show various views of an alternative embodiment of the catheter stabilizer within the haptic interface device in an embodiment of the portable medical simulation system for training healthcare teams of the present invention.
Figure 9B:
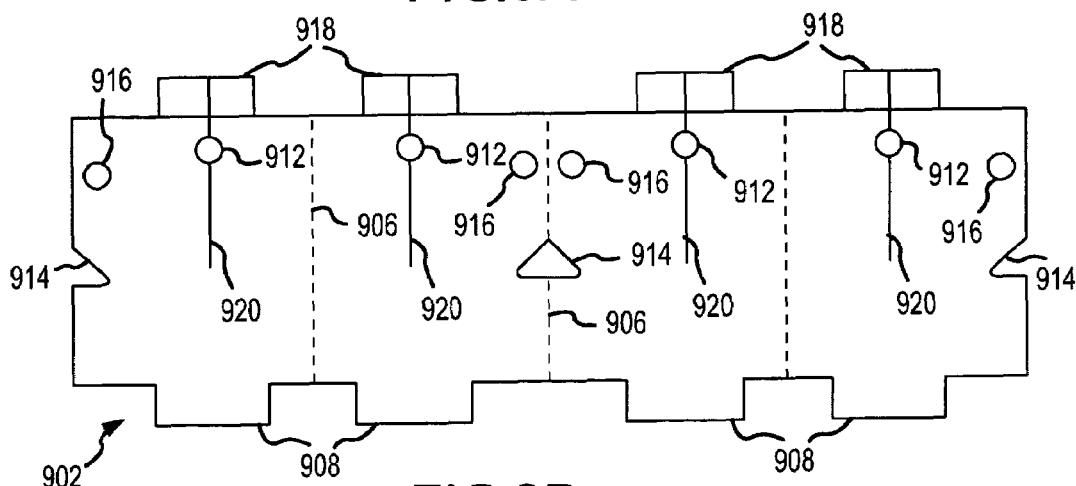
Figures 9C, 9D:
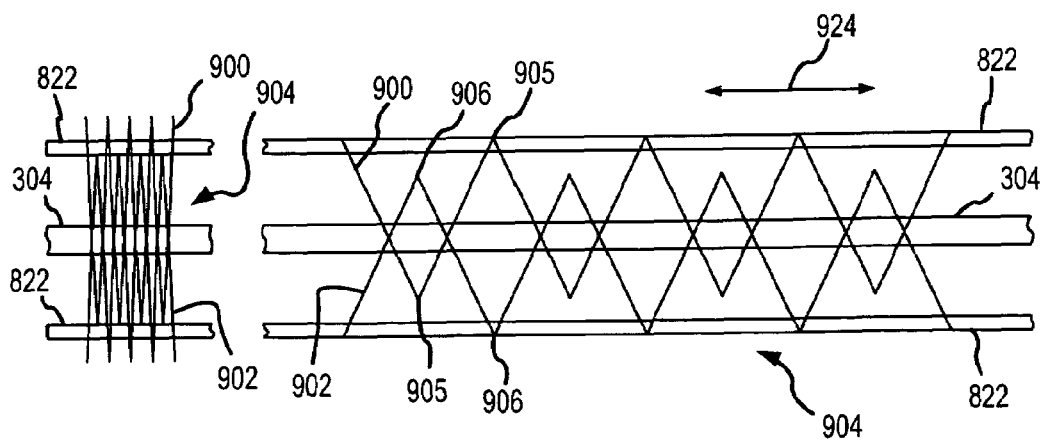

FIGS. 9A, 9B, 9C, and 9D show various views of an alternative embodiment of the catheter stabilizer within the haptic interface device in an embodiment of the portable medical simulation system for training healthcare teams of the present invention. Referring now to FIGS. 9A, 9B, 9C, and 9D, in FIG. 9C, Catheter Stabilizer 904 is shown in a top view in a contracted state typical of when two Carriages 302 are very close together. In FIG. 9D, Catheter Stabilizer 904 is shown in a top view in an expanded state typical of when two Carriages 302 are very far apart. Catheter Stabilizers 904 are attached to Catheter Support Stand 314 and to Carriages 302 as described above. Thus, as each Carriage 302 moves in relationship to each other, Catheter Stabilizers 904 will expand and contract between them as shown.

Catheter Stabilizer 904 is made from two fairly identical strips of material, Top Strip 900 shown in plan view in FIG. 9A, and Bottom Strip 902 shown in plan view in FIG. 9B, the difference being the location of Slits 919, 920. A series of Slits 919 are cut half way through Top Strip 900 from the Bottom Edge 907 upward. A series of Slits 920 are cut half way through Bottom Strip 902 from the Top Edge 918 downwards. The offset distances between each pair of Slits 919, 920 and Fold Lines 905, 906 are one of two different distances, and they alternate with each other along the length of each strip Top Strip 900 and Bottom Strip 902, smaller, larger, smaller, etc. Top Strip 900 and Bottom Strip 902 are folded along Fold Lines 905, 906 accordion style, with the first fold of Top Strip 900 folded opposite to the first fold in Bottom Strip 902. The two strips are then mated along corresponding Slits 919, 920 and inserted together, seating each Slit 919, 920 at its end location to form an expandable linked structure, and forming the criss-cross shape as seen in FIGS. 9C and 9D. An adhesive tape may be applied to Top Edges 918 to add stability to the structure. In one embodiment of the invention, Top Strip 900 and Bottom Strip 902 are made from a 0.003 inch thick Kapton film.

Bottom Edges 907, 908 slide against the top surface of Rail 304. Notches 913, 914 engage with Support Rails 822 located on either side of Rail 304. Thus, Catheter Stabilizer 904 is prevented from moving up and down by Notches 914, Support Rails 822, and Rail 304 as it translates back and forth in the direction indicated by Arrow 924.

Catheter Holes 910 and 912 line up with Catheter Support Tube 316 and Openings 424 in Spring Loaded Collets 416 as described above. Catheter Holes 910 and 912 are sized large enough to not impinge on a catheter inserted there through when Catheter Stabilizer 904 is in an expanded state. An oval shaped or oblong shaped hole may be used instead of a circular hole to help achieve this end. Collision Arm Holes 915, 916 allow the Collision Arm 450 on a Carriage 302 to pass through in order to engage Collision Sensor 448 on the next Carriage 302.

A predetermined length of Top Strip 900 and Bottom Strip 902 are inserted together so as to be able to span, in an expanded state, the maximum distance anticipated between any pair of Carriages 302 or between a Carriage 302 and Catheter Support Stand 314 and stabilize the catheter across the separation distance. The reason for the difference in width between the Fold Lines 905, 906 and the Slits 919, 920 is to allow an offset area for the alternating Fold Lines 905, 906 to lie in the compressed state as discussed above.

Figure 10:
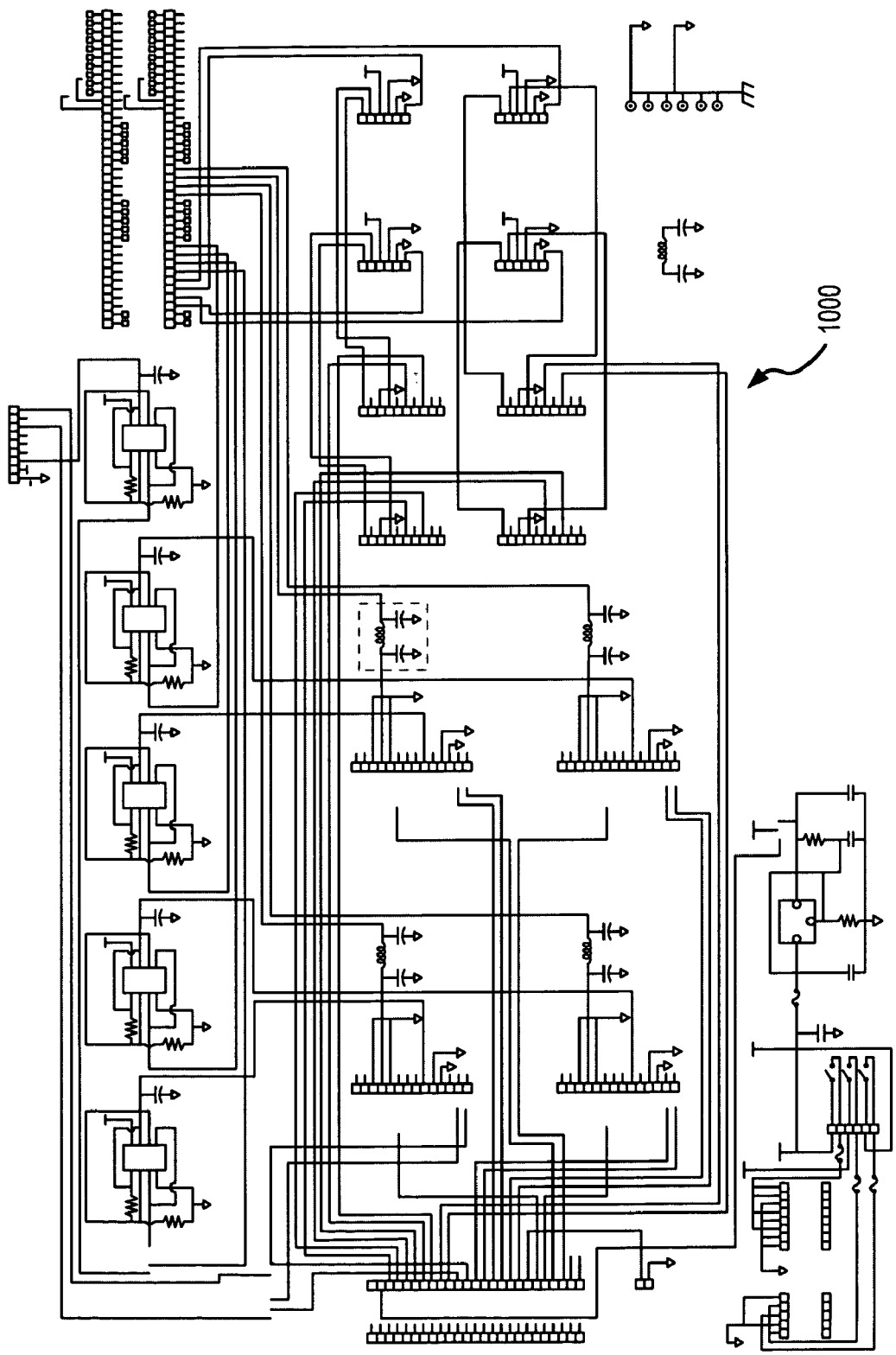
FIG. 10 shows a schematic electrical diagram of the printed circuit board of the haptic interface device in an embodiment of the portable medical simulation system for training healthcare teams of the present invention.

FIG. 10 shows a schematic electrical diagram of the printed circuit board of the haptic interface device in an embodiment of the portable medical simulation system for training healthcare teams of the present invention. Referring now to FIG. 10, all of the components of the Haptic Interface Device 104 tie into the Schematic Electrical Diagram 1000.

Figure 11:
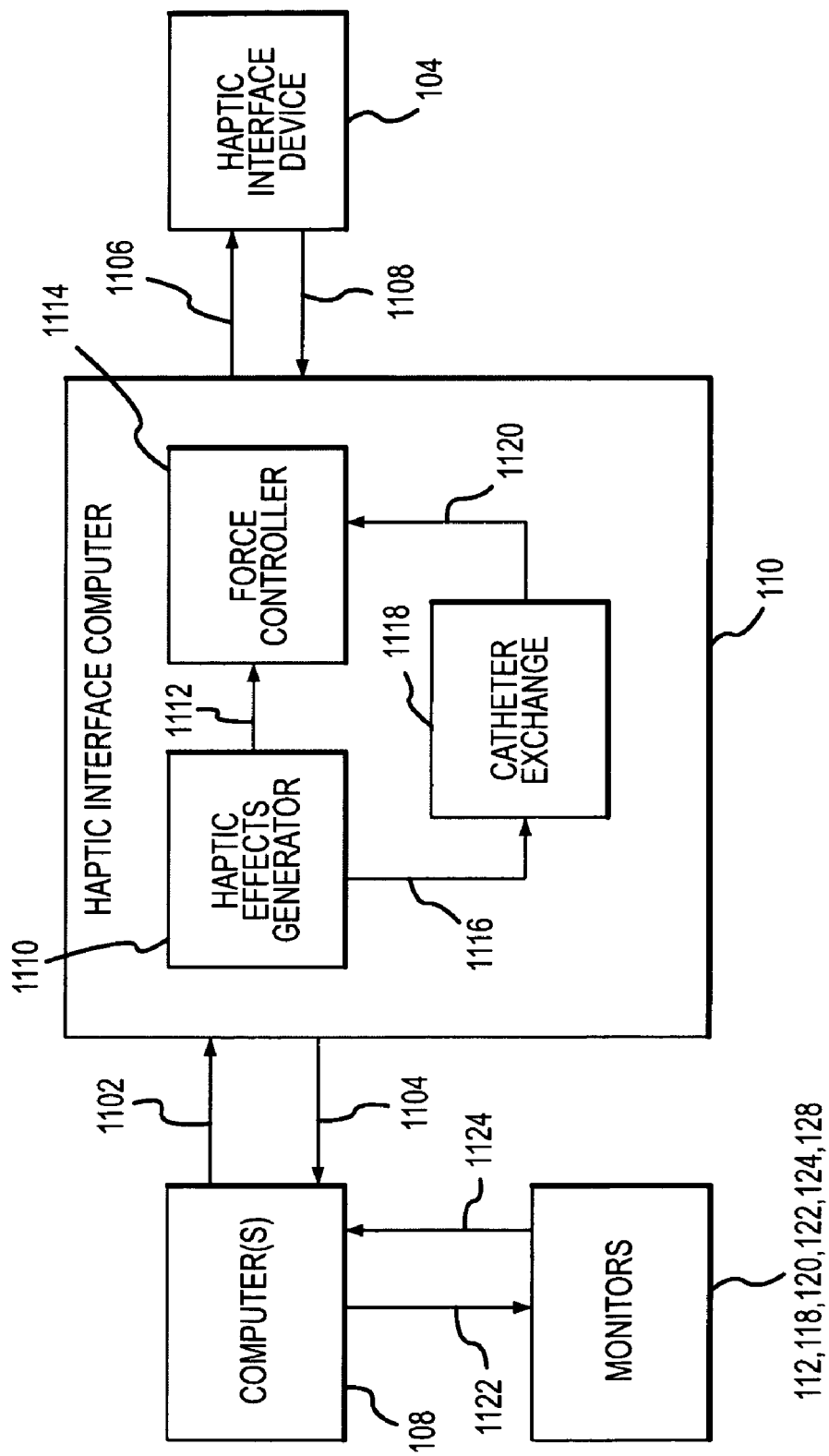
FIG. 11 shows a block diagram of the relationship between the hardware components in an embodiment of the portable medical simulation system for training healthcare teams of the present invention.

FIG. 11 shows a block diagram of the relationship between the hardware components in an embodiment of the portable medical simulation system for training healthcare teams of the present invention. Referring now to FIG. 11, once a medical simulation has been selected to run, the one or more Computers 108 send signals of Desired Behavior Data 1102 to the Haptic Interface Computer 110. Haptic Interface Computer 110 sends Position and Rotation Data 1104 to Computer(s) 108, and sends Motor and Brake Commands 1106 to Haptic Interface Device 104. Haptic Interface Device 104 sends Position, Force, Rotation, and Collision Data 1108 to Haptic Interface Computer 110.

Within Haptic Interface Computer 110, Haptic Effects Generator 1110 processes Desired Behavior Data 1102 and sends Desired Force Data 1112 to Force Controller 1114. Force Controller 1114 processes the Desired Force Data 1112 and generates Motor and Brake Commands 1106 which are sent to Haptic Interface Device 104.

The exception to this process occurs when a catheter exchange event is detected, in which case a Haptic Effects Off Signal 1116 activates Catheter Exchange 1118, which in turn sends Catheter Exchange Data 1120 to Force Controller 1114. Force Controller 1114 processes the Catheter Exchange Data 1120 and generates Motor and Brake Commands 1106 for the catheter exchange which are sent to Haptic Interface Device 104.

Computer(s) 108 throughout the above processes send Display Signals 1122 to the various Monitors, and receives User Input Signals 1124 from the Monitors which are touch screen enabled.

FIGS. 12-20 show representations of a contrast display visual effect derived from a particle emitter software tool that simulates the release of radiopaque dye within a simulated vasculature system for display on a display device in an embodiment of the portable medical simulation system for training healthcare teams of the present invention. The particle based contrast software allows for a more realistic visual display of medically simulated contrast. In the past contrast was simulated by solid shading of the vessel tree in the location of the contrast (dye) injection. The particle based contrast approach allows for physics based particles to be "injected" into a confined vessel space and react to the vessel walls as it would with actual contrast fluid (dye) in an actual surgical procedure.

The particle based contrast software utilizes a node based hierarchy interaction where each node in the tree inherits attributes from its parent node. An emitter node contains all of the physics attributes as well as the trajectory and velocity attributes that it will apply to its particle node children. An emitter node dynamically creates as many particle nodes as is necessary for the given simulation. As a particle node ages it is deactivated and re-used later as needed.

Each node in the particle system can have the following attributes:
  Whether the node is actively being processed;
  The Fuse or countdown to when this node becomes active;
  The current age of the node (how long this node has been active);
  The position of the node;
  The size (Scale) of the node;
  The Color of the node;
  The Velocity of the node;
  The Mass of the node;
  The Display Object associated with this node (if any); and
  Modifiers that modify children of this node, including:
    Scale Modifier—changes the size of the particle;
    Color Modifier—changes the red, green, blue, and alpha ("RGBA") color of the particle;
    Path Modifier—the path that each particle must travel; and
    Physics modifier—described below.

The emitter node physics modifiers contain the following information:

Max age—the maximum age for each particle;
Age variance—the randomness of the starting age of the particle;
Flow direction—the direction of particle flow;
Flow angle variance—randomness in the flow direction;
Start speed—the starting speed of the particle;
Start speed variance—randomness in the start speed;
Mass—the mass of the particle;
Mass variance—randomness in the mass;
Mass growth—rate of change in mass;
Gravity—current gravity;
Drag—current drag; and
Number To Spawn—how many particles to create at each trigger time.

As a particle is emitted into the vessel tree the emitter physics has its strongest control over the position and direction of a particle. The particle is still restrained to the confines of the vessel wall but otherwise may move freely within it. As the calculated blood flow changes in the vessel the particle begins to move in the direction of blood flow and homogenously distributes itself within the vessel wall. Fading down the opacity of the particle and opacifying the vessel wall creates the homogenous distribution effect. This effect allows for the perception of movement from the particles as well as the dissolving effect of the contrast liquid distributing itself inside the vessel wall. As the particle ends its cycle it fades and is deactivated.

The particle based contrast software effect also utilizes the stencil buffer on the display device to allow the particles to pass slightly over the edge of the vessel wall and create a "hard edge" as it reaches the wall. As a particle approaches a branch in the vessel tree the particle calculates its probability of entering that branch and enters it if the odds allow. Otherwise it continues down the vessel path.

Figure 12:
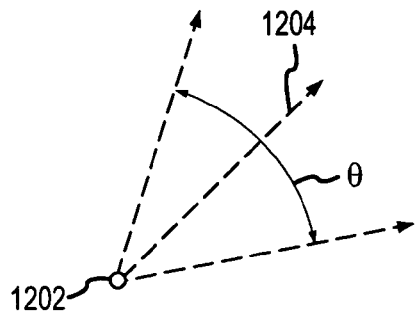
FIGS. 12-20 show representations of a contrast display visual effect derived from a particle emitter software tool that simulates the release of radiopaque dye within a simulated vasculature system for display on a display device in an embodiment of the portable medical simulation system for training healthcare teams of the present invention.

Referring now to FIG. 12, the angle variance from an Emitter Node 1202 is defined by the Angle θ. Arrow 1204 represents the direction of flow in the vessel.

Figure 13:
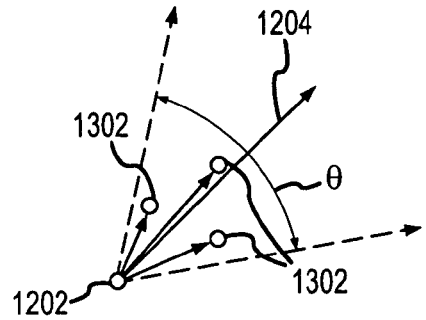

Referring now to FIG. 13, the number of Particles 1302 to spawn per trigger are released from Emitter Node 1202 in directions that vary within the confines of Angle θ in the direction of flow (Arrow 1204).

Figure 14:
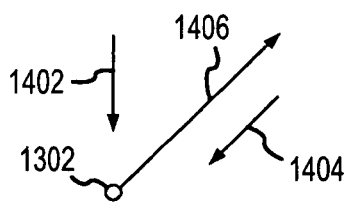

Referring now to FIG. 14, each Particle 1302 calculates its current position based on its current velocity represented by Arrow 1406, its acceleration in the direction represented by Arrow 1406, its mass, the drag in the direction represented by Arrow 1404, and gravity in the direction represented by Arrow 1402.

Figure 15:
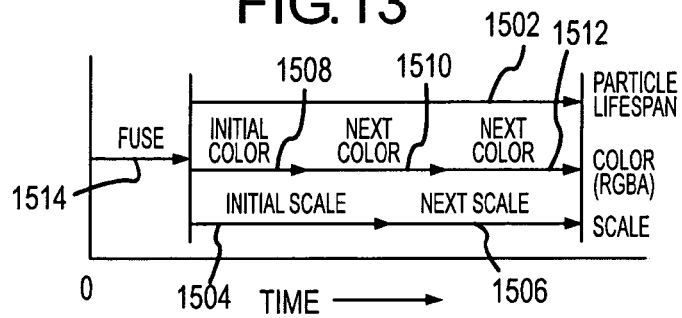

Referring now to FIG. 15, each particle interpolates its list of modifiers over its specified amount of time after its Fuse Time 1514 has elapsed. For each Particle Lifespan 1502, an Initial Scale 1504 lasts for a specified period of time, and then a Next Scale 1506 is established for another specified period of time, and so on until the end of Particle Lifespan 1502. Likewise, an Initial Color 1508 lasts for a specified period of time, and then a Next Color 1510 is established over another specified period of time, and a Next Color 1512, and so on until the end of Particle Lifespan 1502.

Figure 16:
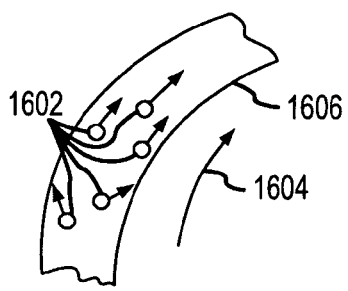

Referring now to FIG. 16, emitted Particles 1602 are collision detected and restrained to stay inside the established walls of Vessel 1606 and move within the direction of flow indicated by Arrow 1604.

Figure 17:
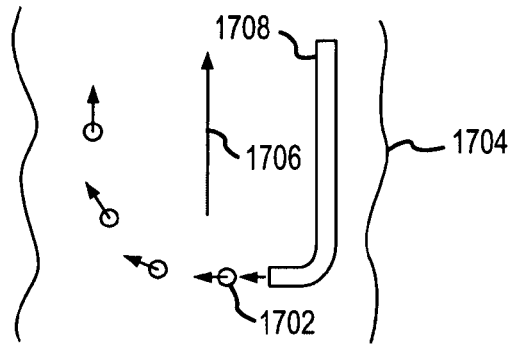

Referring now to FIG. 17, once Particle 1702 is emitted from the end of Catheter 1708, Particle 1702 reacts to the changing flow properties of the environment within Vessel 1704. Interpolating in the flow of the vessel, represented by Arrow 1706, slowly takes over the physics of the Particle 1702 until it is moving in the same direction as the flow indicated by Arrow 1706.

Figure 18:
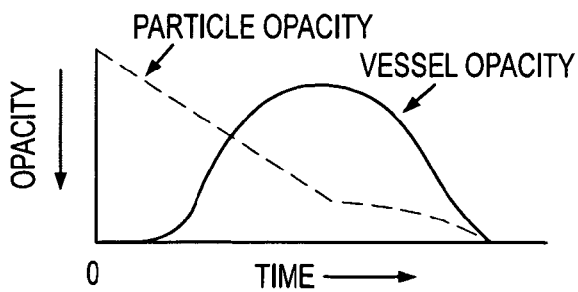

Referring now to FIG. 18, as particle opacity decreases, vessel opacity increases to give the appearance of contrast dispersion. Then, as further time passes, both fade to zero opacity.

Figure 19:
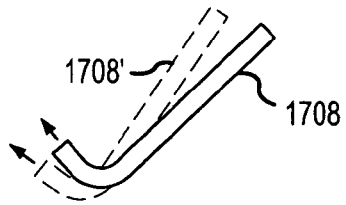

Referring now to FIG. 19, flow direction and position for newly emitted particles are updated by the position and direction of Catheter 1708, 1708'.

Figure 20:
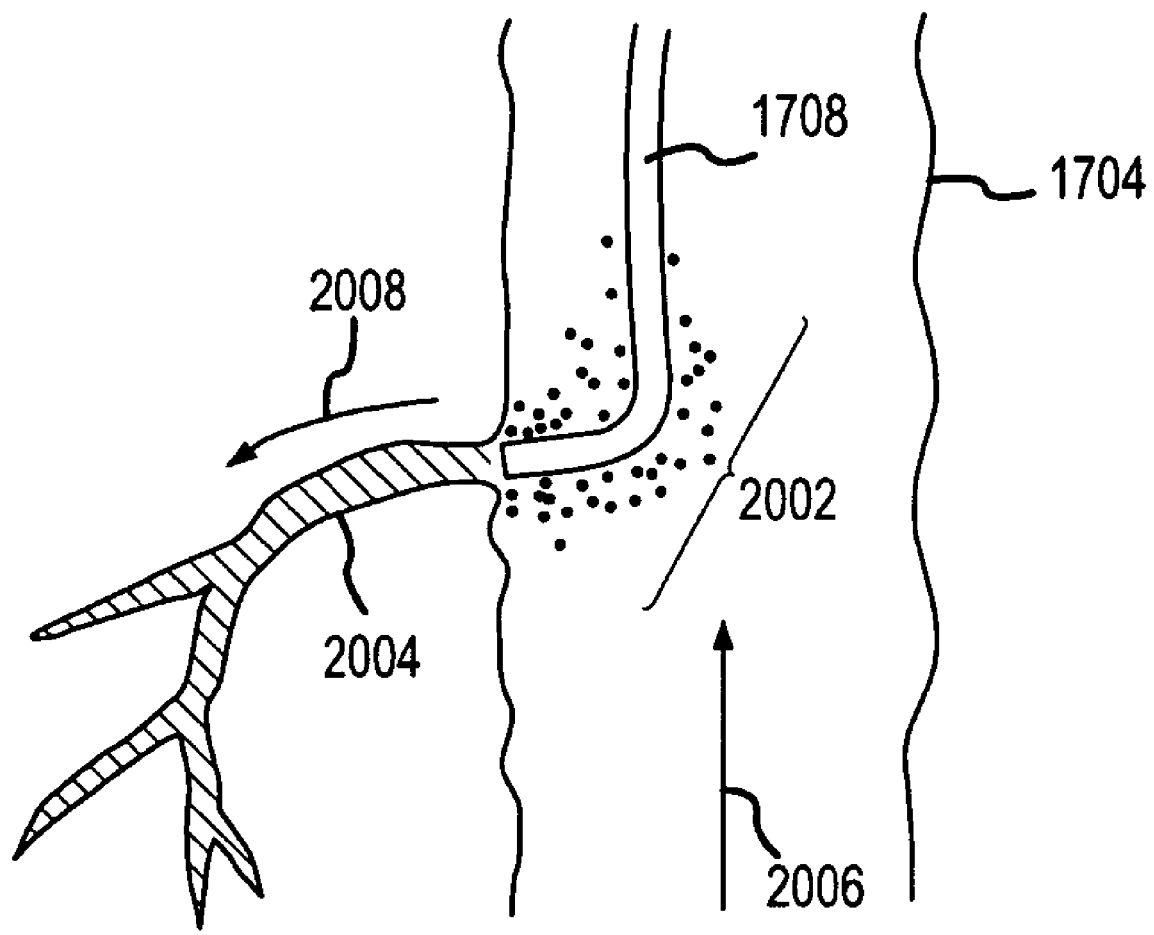

Referring now to FIG. 20, during cannulation, Vessel Back Flow 2002 is simulated by reversing the flow direction of the node emitter. Smaller branches receive darker vessel shading and particles are still sent down the Vessel 2004 in the direction of blood flow indicated by Arrow 2008. Based on the vessel size and the simulated volume of contrast injection fluid, the particles and vessel shading will be lighter to simulate the contrast dispersion. The particles of Vessel Back Flow 2002 move in the direction of blood flow indicated by Arrow 2006.

Having described the present invention, it will be understood by those skilled in the art that many changes in construction and circuitry and widely differing embodiments and applications of the invention will suggest themselves without departing from the scope of the present invention.

What is claimed is:

1. A method for stabilizing a medical device within a haptic interface device, the method comprising the steps of:
   (a) positioning a first expandable linked structure between a first carriages and a support stand of the haptic interface device, wherein said first expandable linked structure has a plurality of primary links and a plurality of secondary links alternately adhered together at middle portions of each of said plurality of primary links and said plurality of secondary links;
   (b) receiving the medical device in a support tube attached to said support stand;
   (c) passing the medical device from said support tube to said first carriage through a plurality of holes in each of said plurality of primary links and a plurality of holes in each of said plurality of secondary links of said first expandable linked structure, wherein said plurality of holes in each of said plurality of primary links and said plurality of holes in each of said plurality of secondary links are aligned together and aligned with said support tube and aligned with an opening in said first carriage; and
   (d) moving said first carriage a distance away from said support stand, wherein said first expandable linked structure expands and provides stabilizing force to the medical device across said distance.

2. The method according to claim 1 further comprising the step of:
   slidably engaging a pair of bottom edges of each of said plurality of primary links and each of said plurality of secondary links of said first expandable linked structure with a top surface of a rail of the haptic interface device when said first carriage is moved said distance away from said support stand.

3. The method according to claim 1 further comprising the step of:
   engaging a first support rail with a plurality of first notches located along each of a first fold on a first side of each of said plurality of primary links; and
   engaging a second support rail with a plurality of second notches located along each of a second fold on a second side of each of said plurality of primary links;

wherein said first and second support rails engaged with said plurality of first notches and said plurality of second notches prevents said first expandable linked structure from moving up and down as said first expandable linked structure expands when said first carriage moves said distance away from said support stand.

4. The method according to claim 1 further comprising the step of:
receiving a collision arm located on said support stand though a plurality of collision arm holes located in each of said plurality of primary links and aligned with each other;
wherein said collision arm engages with a collision sensor on said first carriage should said first carriage move too close to said support stand.

5. The method according to claim 1 wherein said positioning step further comprises the steps of:
attaching a first end of said first expandable linked structure to said support stand; and
attaching a second end of said first expandable linked structure to an aft end of said first carriage.

6. The method according to claim 1 further comprising the steps of:
positioning a second expandable linked structure between said first carriage and a second carriage of the haptic interface device;
attaching a first end of said second expandable linked structure to said first carriage; and
attaching a second end of said second expandable linked structure to an aft end of said second carriage.

7. The method according to claim 6 further comprising the step of:
repeating said steps in claim 6 for a next expandable linked structure until all of a plurality of carriages of the haptic interface device have said next expandable linked structure positioned and attached between them.

8. A method for stabilizing a medical device within a haptic interface device, the method comprising the steps of:
(a) positioning an expandable linked structure between each of a plurality of carriages of the haptic interface device and between a first carriage and a support stand of the haptic interface device, wherein each said expandable linked structure has a first strip and a second strip folded accordion style and inserted and seated together though a plurality of opposing slits in each of said first and second strips;
(b) receiving the medical device in a support tube attached to said support stand;
(c) passing the medical device from said support tube to a first carriage of said plurality of carriages though a plurality of holes in said first strip and a plurality of holes in said second strip of a first expandable linked structure, wherein said plurality of holes in said first strip and said plurality of holes in said second strip are aligned together and aligned with said support tube and aligned with an opening in said first carriage; and
(d) moving said first carriage a distance away from said support stand, wherein said first expandable linked structure expands and provides stabilizing force to the medical device across said distance.

9. The method according to claim 8 further comprising the step of:
slidably engaging a plurality of bottom edges of each of said first and second strips of said first expandable linked structure with a top surface of a rail of the haptic interface device when said first carriage is moved said distance away from said support stand.

10. The method according to claim 8 further comprising the steps of:
engaging a first support rail with a plurality of first notches located along each of an outermost fold of said first strip; and
engaging a second support rail with a plurality of second notches located along each of an outermost fold of said second strip;
wherein said first and second support rails engaged with said plurality of first notches and said plurality of second notches in said first and second strips prevents said first expandable linked structure from moving up and down as said first expandable linked structure expands when said first carriage moves said distance away from said support stand.

11. The method according to claim 8 further comprising the step of:
receiving a collision arm located on said support stand though a plurality of collision arm holes located in each of said first and second strips of said first expandable linked structure wherein said plurality of collision arm holes are aligned with each other;
wherein said collision arm engages with a collision sensor on said first carriage should said first carriage move too close to said support stand.

12. The method according to claim 8 wherein said positioning step further comprises the steps of:
attaching a first end of said first expandable linked structure to said support stand; and
attaching a second end of said first expandable linked structure to an aft end of said first carriage.

13. The method according to claim 8 further comprising the steps of:
positioning a second expandable linked structure between said first carriage and a second carriage of the haptic interface device;
attaching a first end of said second expandable linked structure to a fore end of said first carriage; and
attaching a second end of said second expandable linked structure to an aft end of said second carriage.

14. The method according to claim 13 further comprising the step of:
repeating said steps in claim 13 for a next expandable linked structure until all of a plurality of carriages of the haptic interface device have said next expandable linked structure positioned and attached between them.

* * * * *